United States Patent [19]
Brehm

[11] 3,865,317
[45] Feb. 11, 1975

[54] MINI-MASHER
[76] Inventor: Alma Louise Brehm, 1040 E. Ellsworth Ave., Denver, Colo. 80223
[22] Filed: Mar. 19, 1973
[21] Appl. No.: 342,595

[52] U.S. Cl. .............................................. 241/169.2
[51] Int. Cl. ............................................ A47j 43/10
[58] Field of Search ................................. 241/169.2

[56] References Cited
UNITED STATES PATENTS
| | | | |
|---|---|---|---|
| 1,219,580 | 3/1917 | Pancoast | 241/169.2 X |
| 2,714,909 | 8/1955 | Bryn | 241/169.2 X |
| 2,785,718 | 3/1957 | Moos | 241/169.2 |

*Primary Examiner*—Roy Lake
*Assistant Examiner*—E. F. Desmond

[57] ABSTRACT

A durable, efficient and convenient kitchen utensil, intended for use in the home for the preparation of specific dishes, is herein disclosed.

The Mini-masher, as the name implies, is an implement especially useful to a person living alone, who might wish to prepare a single potato as part of a meal by mashing it in a small pan, bowl or similar container.

The diminutive size of the present invention offers the advantage of utility in preparing the small potato serving, while retaining the advantages of a larger implement of similar design and function.

1 Claim, 2 Drawing Figures

PATENTED FEB 1 1 1975　　　　　　　　　　　3,865,317

MINI-MASHER

BACKGROUND OF THE INVENTION

The concept behind the present invention results from a recognized need, by a housewife, of the advantages which are derived from the use of a small-sized utensil in the preparation of small or limited portions of the specific dish involved.

OBJECTS OF THE PRESENT INVENTION

The primary object of the present invention is to provide the user with a convenient and useful kitchen utensil which is designed with an intentionally small mashing head, which is especially adaptable for mashing a single potato in a small-sized container, which is intended for a single serving.

DETAILED DESCRIPTION

Figure 1:
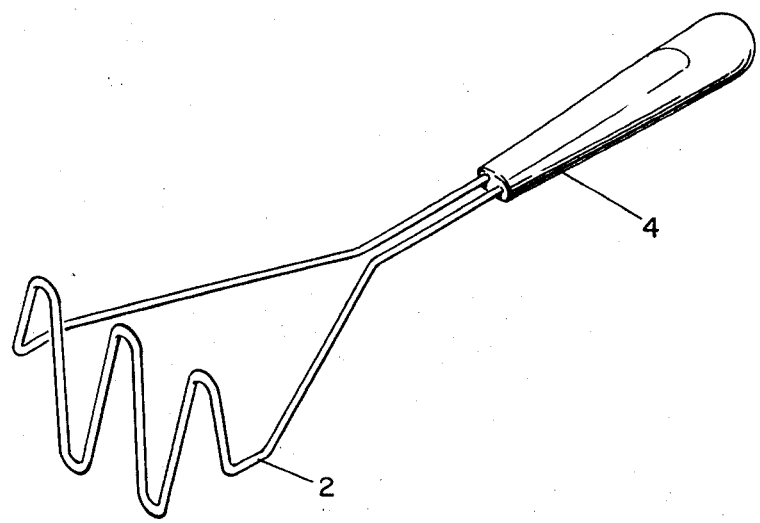
FIG. 1 is a three-dimensional illustration of the present device.

The present device, as designed in accordance with the concepts of the invention disclosure, is described as follows:

As shown in FIG. 1, the assembled unit consists of two main component parts: the mashing head (reference numeral 2), which may be fabricated from rustless steel or similar durable material, and the handle portion of the device (reference numeral 4), which should be integrally molded onto the mashing head, and formed of a heat-resistant material.

Figure 2:
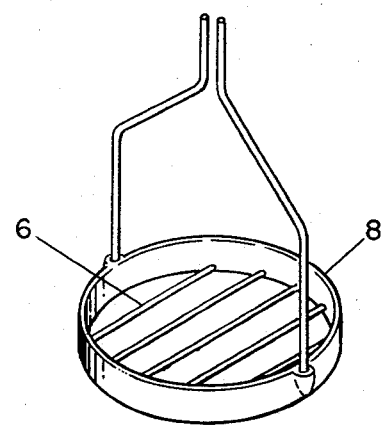
FIG. 2 is a three-dimensional detail view of the device.

FIG. 2 illustrates a mashing head of an alternate design, consisting of a number of tines (reference numeral 6), which are enclosed by, and affixed to a circular ring (reference numeral 8), which in turn is attached to a handle similar to that shown in FIG. 1, completing the device.

What is claimed for the present invention is:

1. A potato and vegetable mashing device comprising:
    a mashing head including a cylindrical ring-like member having a circular top edge, a circular bottom edge, and cylindrical side walls;
    a plurality of spaced apart parallelly disposed tine members each formed of an elongated circular rod with each extending between transversely opposite points disposed about a diametric axis of said cylindrical ring and affixed to said points interiorly of said ring, said tine members each having a line of contact disposed adjacent the plane defined by the bottom edge of said cylindrical ring member;
    a pair of diametrically spaced apart flange members formed integrally with said cylindrical ring and projecting outwardly of said exterior surface thereof, said flange members disposed along the diametric axis of said ring normal to the axis of each of said tine members;
    a socket defined in each flange member opening out of the top surface thereof and extending thereinto in a direction normal to the plane of said tine members;
    a pair of identical generally Z-shaped upright members, each upright associated with one of said sockets and having one end affixed in said associated socket, said uprights extending upwardly from said cylindrical ring to a position spaced thereabove, and then projecting over the area of said ring in a converging manner until disposed adjacent each other substantially bracketing the axis of said ring, from whence said uprights project upwardly therefrom in a direction parallel to said axis; and
    a handle member having side walls, a front end, and a back end, said front end having a pair of spaced apart sockets opening thereoutof and extending longitudinally thereinto, said sockets adapted to receive said terminal end portions of said uprights to affix said handle thereto.

* * * * *